United States Patent [19]

Annegarn et al.

[11] 4,456,923
[45] Jun. 26, 1984

[54] COLOR TELEVISION DISPLAY DEVICE COMPRISING A PLURALITY OF PICTURE DISPLAY TUBES

[75] Inventors: Marcellinus J. J. C. Annegarn; Werner A. L. Heijnemans, both of Eindhoven, Netherlands

[73] Assignee: U.S. Philips Corporation, New York, N.Y.

[21] Appl. No.: 384,825

[22] Filed: Jun. 3, 1982

[30] Foreign Application Priority Data

May 5, 1981 [NL] Netherlands .................. 8102720

[51] Int. Cl.³ ............................................ H04N 9/20
[52] U.S. Cl. ..................................... 358/64; 358/60
[58] Field of Search .............. 358/60, 64, 231, 237, 358/3, 88, 89, 90, 91, 92

[56] References Cited

U.S. PATENT DOCUMENTS 3,943,279  3/1976  Austefjord ........................ 358/60
4,306,248  12/1981 Goodman ......................... 358/60
4,395,662  7/1983  Sexton, Jr. ....................... 358/60

Primary Examiner—Michael A. Masinick
Attorney, Agent, or Firm—Thomas A. Briody; William J. Streeter

[57] ABSTRACT

A color television display device comprising a plurality of picture display tubes for displaying a color television signal. In order to eliminate a flicker effect which particularly occurs for unsatured colors at high luminance, the vertical deflection of a first group of the display tubes as well as the video signals applied thereto are delayed by the same time delay with respect to a second group of the display tubes.

9 Claims, 5 Drawing Figures

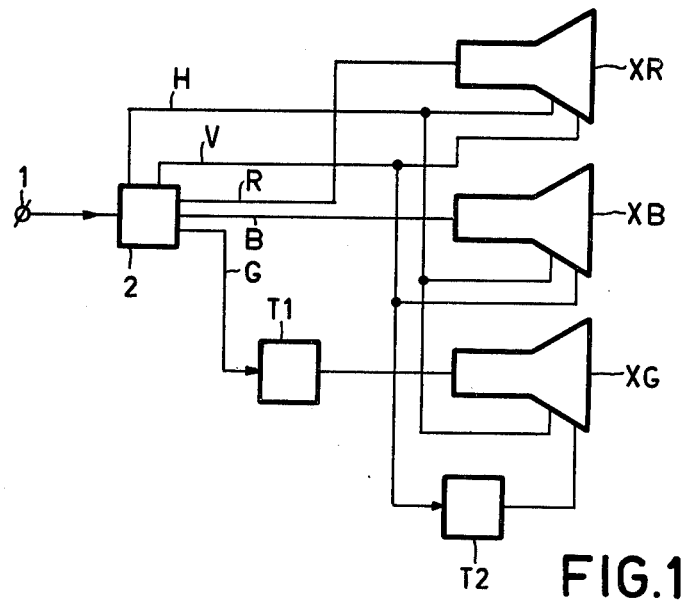
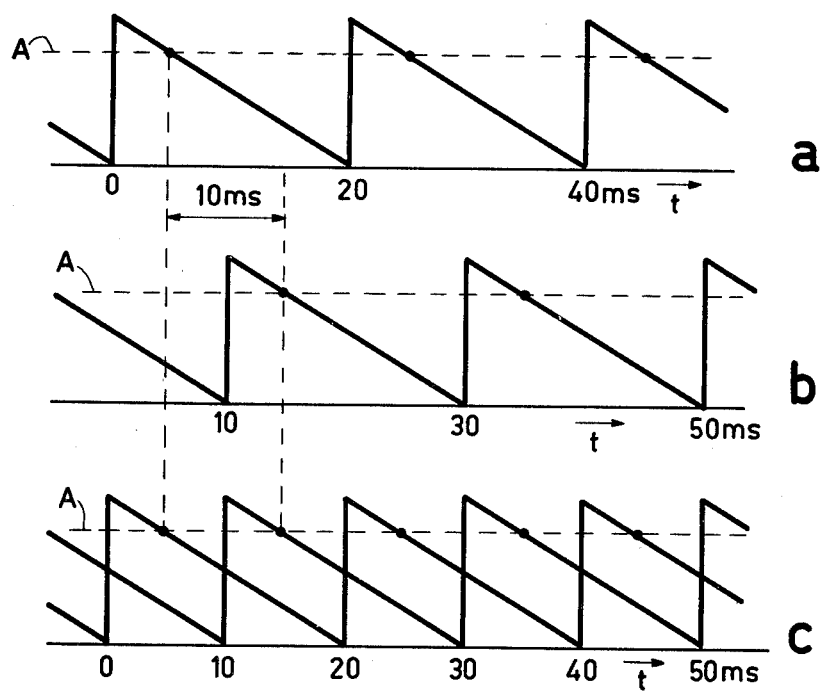
FIG.1
FIG.2

COLOR TELEVISION DISPLAY DEVICE COMPRISING A PLURALITY OF PICTURE DISPLAY TUBES

BACKGROUND OF THE INVENTION

The invention relates to a colour television display device comprising a plurality of picture display tubes for displaying a colour television signal, each tube having a control electrode for receiving a video signal, a line deflection coil for deflecting in the horizontal direction an electron beam generated in the tube and a field deflection coil for deflecting the electron beam in the vertical direction.

In such a television display device, for example, a colour television projection device, a plurality of display tubes is used in order to increase particularly the luminance of the colour picture displayed. However, in areas which unsaturated colours are displayed a flicker effect may be produced at high luminance, which effect is caused by the comparatively low frequency, namely 50 Hz in accordance with the European standard, of the vertical deflection. In each second the eye receives only 50 light pulses from the picture and at high luminance this number of pulses is below the frequency for which the eye is sensitive to flicker.

It is obvious that the flicker effect may be eliminated by increasing the field frequency. The repetition frequency of the received field synchronizing signals may, for example, be doubled in a simple way, resulting in a field frequency of 100 Hz. However, this measure requires a line frequency which is higher than that of the received line synchronizing pulses, and video stores for storing the video information. For an acceptable quality of the displayed picture this means that rather complicated and consequently costly circuits must be used.

SUMMARY OF THE INVENTION

The invention has for its object to provide a colour television display device of the above-described type, wherein the flicker effect can be considerably reduced with simple means and without changing the field frequency and to this end the display device according to the invention is characterized in that a delay device is provided for delaying by substantially the same delay the vertical deflection of a first group of the display tubes with respect to the vertical deflection of a second group of the display tubes and the video signals applied to the control electrodes of the display tubes of the first group with respect to the video signals applied to the control electrodes of the display tubes of the second group.

With the invention under certain conditions light pulses occur on the display screen at certain places with effectively a frequency higher than the field frequency. Preferably the delay is equal to an integral number of line periods of the horizontal deflection, so that a corresponding delay in the channel for the horizontal deflection may be dispensed with.

The display device according to the invention may also be characterized in that the luminance of the picture displayed by the first group is substantially equal, at least for given colours, to the luminance of the picture displayed by the second group for the same colours.

If the device comprises a first triplet of three colour display tubes each for displaying a different one of the three primary colours and a second similar triplet of three colour display tubes, then the device is characterized in that the first triplet forms the first group and the second triplet the second group of the display tubes.

If however the device comprises three colour display tubes each for displaying a different one of the three primary colours and a monochrome display tube for displaying black and white pictures, then the arrangement is characterized in that the three colour display tubes form the second group, while the monochrome display tube forms the first group of the display tubes.

The invention will now be described by way of example with reference to the accompanying drawing.

DESCRIPTION OF THE DRAWING

FIG. 1 shows a simplified circuit diagram of an arrangement for explaining the invention, FIG. 2 shows time diagrams for a better understanding thereof.

DESCRIPTION OF THE PREFERRED EMBODIMENTS

Figure 3:
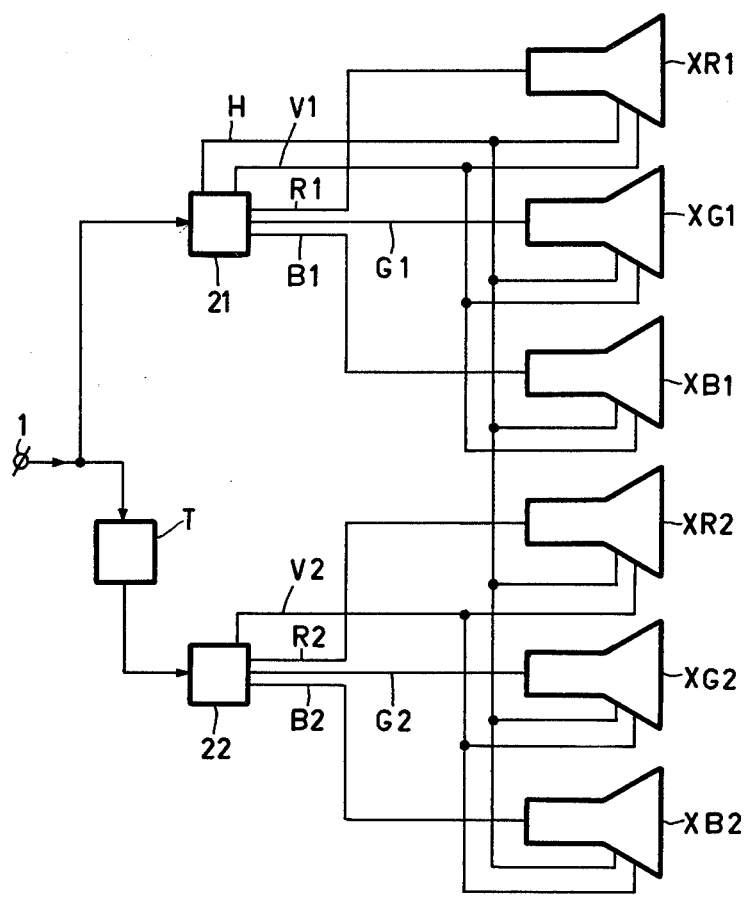
FIG. 3 shows a simplified circuit diagram of a six-tube projection device in which the invention is employed.

In FIG. 1, reference numeral 1 denotes an input terminal for receiving a composite video signal. Terminal 1 is connected to a receiving section, (not shown) in which a received television signal is amplified and processed in known manner. The signal available on terminal 1 is applied to a signal processing portion 2, which produces the three colour television signals for red (R), for green (G) and for blue (B) as well as the signal (H) for the horizontal deflection and the signal (V) for the vertical deflection.

Signal R is applied to the control electrode of a projection tube XR for the display of the red colour, while signal H is applied to the line deflection coil (not shown) for deflecting the electron beam generated in tube XR in the horizontal direction, while signal V is applied to the field deflection coil for deflecting the said electron beam in the vertical direction. In a similar manner signal B is applied to the control electrode of a projection tube XB for the display of the blue colour, while signal H is applied to the line deflection coil and signal V to the field deflection coil of tube XB. FIG. 1 is a highly schematical representation, as the manner in which the said signals are processed and applied is known and of no importance for the invention.

Via a delay device T1 signal G is applied to the control electrode of a projection tube XG for the display of the green colour. Signal V is applied to the field deflection coil of tube XG via a delay device T2, while signal H is applied without delay to the line deflection coil of tube XG. The time delays produced by the two delay devices are substantially equal. The delay devices may be in the form of video stores assembled from serial delay elements, for example shift registers. The delay for signal V may be effected by delaying the field synchronizing signal of the signal on terminal 1 in portion 2 before it is applied to a field deflection generator.

During operation, the pictures generated by tubes XR, XB and XG are projected in known manner on a projection screen. FIG. 2a shows as a function of time the travel in the vertical direction of the dot of light produced by tubes XR and XB on the screen. For the sake of simplicity, the flyback period is here assumed to be infinitely short, while the trace period in which video information is written on the screen has a duration of 20 ms at a field frequency of 50 Hz. During this period of time the displacement is a substantially linear function of the time. The dotted line A in FIG. 2 indicates a certain position on the screen. From the Figure it appears that light pulses of a colour determined by signals R and B occur in this position with a repetition frequency of 50 Hz, that is to say with an interval of 20 ms.

In a similar manner as FIG. 2a FIG. 2b shows the travel in the vertical direction of the dot of light on the screen, produced by tube XG. Herein, the sawtooth-shape is delayed by approximately 10 ms relative to the sawtooth-shape of FIG. 2a. From a similar, dotted line A as in FIG. 2a it appears that light pulses of the green colour occur in the same position as in the foregoing and with a frequency of 50 Hz, but 10 ms later, than the light pulses of FIG. 2a. In FIG. 2c the two sawtooth shapes of FIGS. 2a and 2b are plotted relative to the same time axis; from this it is obvious that in the place indicated by line A light pulses occur with an interval of 10 ms. So the repetition frequency thereof is, as it were, 100 Hz.

It is necessary that the video information projected by tube XG corresponds with the video information projected by tubes XR and XB, that is to say the three information items must relate to the same picture detail to be displayed. For this reason signal G must be subjected to the same delay as signal V. Also the signal for the horizontal deflection of the electron beam generated in tube XG must be subjected to a determined delay relative to the corresponding signal for tubes XR and SB. Since 10 ms corresponds to $156\frac{1}{4}$ line periods, for signal H a delay of one quarter of a line period is necessary. This may, however, be dispensed with if the delay produced by delay devices $T_1$ and $T_2$ is equal to an integral number of line periods, for example 156 line periods, i.e. 9.984 ms, for the European standard of 2 fields each having $312\frac{1}{2}$ lines per picture, one line period having a duration of 64 $\mu$s.

The value of 9.984 ms opted for is very close to the above-mentioned value of 10 ms; it will however be obvious that any value which is approximately equal to half the field period of 20 ms is suitable, provided said value is equal to an integral number of line periods. An indispensable condition for the complete elimination of the flicker effect is however that the luminance $L_T$ of the delayed drive signal is equal to the luminance $L_D$ of the direct drive signal, so that no 50 Hz-component is present in the displayed signal:

$$L_T = L_D \qquad (1)$$

In practice condition (1) will be somewhat deviated from.

A disadvantage of the design having three projection tubes is that good zonal flicker reduction can be obtained for only a limited number of colours. For example, for red for which it holds that $R=1$ and $B=G=0$ the delay of signal G has no result, so that a 50 Hz component is yet present. For peak-white, i.e. white having the highest possible luminance, it holds that $W=0.38 R+0.59 G+0.1 B=1$ if $R=G=B=1$, so that $L_T=0.59 G=0.59$, while $L_D=0.30 R+0.11 B=0.41$. From this it appears that condition (1) is not satisfied and that consequently a complete elimination of zonal flicker is not possible for white, while zonal flicker in normal scenes has the most frequent rate of occurrence precisely in the white portions of the picture owing to the high luminance thereof. So an arrangement of more than three tubes is necessary.

FIG. 3 shows a simplified circuit diagram of a six-tube projector having two projection tubes XR1 and XR2 for displaying the red colour, two projection tubes XG1 and XG2 for displaying the green colour and two projection tubes XB1 and XB2 for displaying the blue colour. The most important advantage of a six-tube projector compared with a three-tube projector is the fact that the luminance obtained can be twice as high. In addition, the shift which is commonly referred to as colour shift, i.e. the effect that the hue of the observed picture depends on the position of the viewer, can be avoided. With an arrangement having three tubes disposed horizontally a viewer which is in a position next to the projector sees a picture which, owing to reflection of the light beams on the screen has an excessive quantity of the colour of the tube which is remotest from him. This effect does not occur when 6 tubes are used, if tube XR2 is placed over tube XB1 and tube XB2 over tube XR1.

With a six-tube projector zonal flicker reduction can be obtained because of the fact that the vertical deflection as well as the video signal for one or more tubes are delayed in a similar manner as in FIG. 1. In FIG. 3 the delay holds for the second triplet XR2, XG2, XB2. The video signal available on terminal 1 is applied to a signal processing portion 21 which applies the three colour television signals for red (R1), for green (G1) and for blue (B1) as well as the signal (H) for the horizontal and the signal (V1) for the vertical deflection to the tubes XR1, XG1 and XB1 of the first triplet. The signal of terminal 1 is also applied to a delay element T the output signal of which is applied to a signal processing portion 22. For tubes XR2, XG2 and XB2 portion 22 generates the three colour television signals for red (R2), for green (G2) and for blue (B2), as well as the signal (V2) for the vertical deflection.

If the delay produced by device T is equal to an integral number of line periods, then the horizontal deflection for the second triplet need not be delayed and signal H may be employed for this purpose, as in FIG. 1. Also the line deflection signal included in the delayed video signal is suitable therefor.

It will be seen that for all colours condition (1) can be satisfied with the projector shown in FIG. 3. Also here a delay of 9.984 ms may be opted for, whereby a field frequency of 100 Hz is imitated in a simple way. A still higher frequency can be obtained, if necessary, if the tubes, as regards their delays, are not divided into two but into three or more groups. With three groups of, for example, two tubes each a field frequency of 150 Hz can be imitated, because of the fact that the second group is delayed relative to the first group while the third group is delayed relative to the second group, both time delays being approximately 6.7 ms.

Of course the six-tube projector has the disadvantage that its price is high. This disadvantage is much less for a four-tube projector. A still cheaper projector is obtained if it comprises a monochrome (black/white) tube of a comparatively high quality and three colour tubes of a poorer quality. A poorer quality is here understood to mean that the colour tubes furnish a lower contribution in the sharpness of the projected picture because their bandwidth is less than the bandwidth of the black/white tube. This is justified by the fact that the eye is less sensitive for imperfections, for example convergence errors, in the colour information than for imperfections in the luminance information.

It is obvious that is not possible to satisfy all requirements with a four-tube projector, so that for a certain object a compromise must be looked for. If the invention is employed in a projector of this type, more specifically in such a way that the vertical deflection and the control signal for the black/white tube are delayed, then the zonal flicker reduction can be obtained precisely there where it is most desirable, that is to say in the white protions of the picture, while the manner of driving the projection tubes by the colour television signals furnishes a degree of freedom. If the picture produced by the black/white tube is sharper than the picture produced by one or more of the remaining three tubes, in other words if the projector is provided with an expensive white and three cheap colour tubes then the projected picture may, for example, be optimized as regards its sharpness. So the drive will be chosen thus that the black/white tube is active for all colours.

In the further course of the description the following symbols will be used: R, G, B and W are the colour television signals intended for the respective projection tubes XR for red, XG for green, XB for blue and XW for white, r, g and b represent the red, green and blue components in the colour to be displayed, while y is the luminance signal and is given by the known formula $y = 0.30\,r + 0.59\,g + 0.11\,b$. All the said quantities are standardized between 0 and 1. At the same time it is assumed for the sake of simplicity that $W = 1$ while $R = G = B = 0$ results in the same luminance as $R = G = B = 1$, while $W = 0$, that is to say that for peak-white the black/white tube produces the same luminance as the luminance of peak-white produced by the three colour tubes. In practice this assumption will be deviated from in view of the different colour yields of the tube phosphors, owing to the different losses in the optical devices, etc. So the drive signals of the four tubes are indicated by R, G, B and W while r, g and b are the colour signals for a three-tube arrangement. In addition, m represents the smallest signal of the signals r, g and b.

With these symbols the signal transform is as follows:
R = r − m
G = g − m
B = b − m and
W = m.

From this it appears that at least one of the signals R, G and B is zero and that R, G and B are linear combinations of the colour difference signals (r−y) and (b−y). Usually these signals are transmitted with a limited bandwidth, so that display by means of colour tubes of a poorer quality is justified. As signals R, G and B are positive or at least equal to zero it appears from the transformation formulae that also signals R, G, B and W are positive or zero, which is correct, since the generation of a negative light is impossible.

If, for example, the red component of the colour to be displayed is minimal, that is to say r = m, then the transform:
R = 0
G = g − r = (g−y) − (r−y)
B = b − r = (b−y) − (r−y)
w = r.

Since (g−y) may be written as a function of (r−y) and (b−y) and that as follows:

$$g - y = -\frac{0.30}{0.59}(r - y) - \frac{0.11}{0.59}(b - y),$$

G is written as follows:

$$G = -\frac{0.11}{0.59}(b - y) - \frac{0.89}{0.59}(r - y).$$

This is indeed a linear combination of (r−y) and (b−y). For the considered colour the luminance is $$Y = 0.30R + 0.59G + 0.11B + W$$
$$= -0.11(b - y) - 0.89(r - y) + 0.11(r - y) + r$$
$$= y,$$

that is to say the luminance has not been changed by the transform.

For peak-white it holds that $r = g = b = m = 1$, so that $y = 1$, from which it follows that:
R = G = B = 0
W = 1 and Y = 1.

Also in this case y and Y are equal. From this it appears, however, that with this mode of drive a drive signal is only applied to tube XW for peak-white. If, in accordance with the invention, signal W is delayed relative to the remaining three signals then condition (1) cannot be satisfied for the white portions of the picture. Consequently the picture must not be optimized as regards sharpness but as regards zonal flicker reduction.

For this purpose the following signal transform is chosen:
R = r − W
G = g − W
B = b − W and as R, G and B must be positive or zero, it must hold that $$W \leq m \qquad (2)$$

If the drive signal for tube XW as well as the vertical deflection therefor is delayed relative to the corresponding quantities of the remaining tubes then condition (1) must be satisfied at least approximately. This means that $$0.30\,R + 0.59\,G + 0.11B = W$$

so that $$0.30(r - W) + 0.59(g - W) + 0.11(b - W) = W$$

or:
$$y - W = W,$$

from which it follows that $W = \frac{1}{2}y$. So W is equal to $\frac{1}{2}y$, unless this value is greater than m, in which case W must be equal to m.

Figure 4:
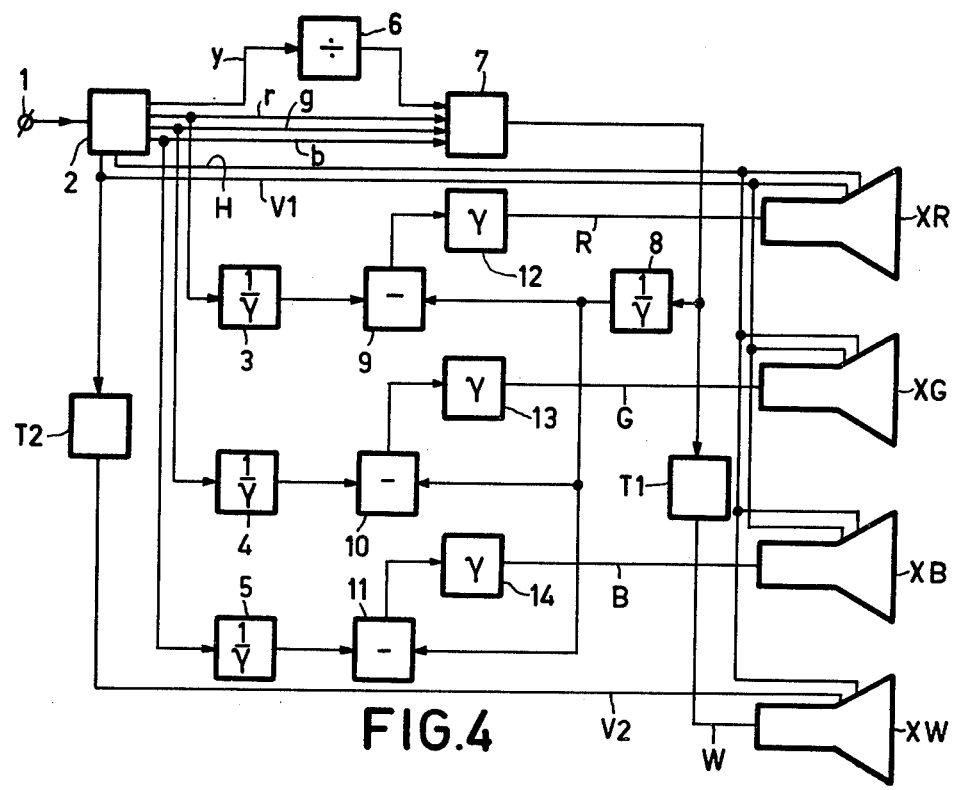
FIG. 4 shows a simplified circuit diagram of a preferred embodiment of a four-tube production device in which the invention is employed and FIG. 5 shows a variant of the device shown in FIG. 4.

FIG. 4 is a circuit diagram of a four-tube projector in which the foregoing is employed. It should be noted that in the foregoing the transmission was assumed to be linear, that is to say with a so-called gamma of 1. In actual fact the transmission is not linear, that is to say the luminance on the display screen of a projection tube and consequently on the projection screen is not a linear function of the electric signals handled, while the signals available on terminal 1 have been subjected to a gamma correction. For these reasons the output signal r, g and b of signal processing portion 2 are each applied in FIG. 4 to an inverse gamma correction circuit 3, 4 and 5, respectively. Portion 2 also generates the luminance signal y which is divided by a dividing circuit 6. If the above simplifications are applied the divider should be 2: in practice the divider must be found empirically.

The output signal of dividing circuit 6 and also the signals r, g and b are applied to a comparison stage 7 in which the smallest of the compared signals is determined. Stage 7 may be formed, for example, by means of diodes, one diode being included in the relevant signal path and one diode being conductive for the smallest signal while the other diodes are non-conductive. Via an inverse gamma correction circuit 8 the output signal of stage 7 is applied to three subtracting stages 9, 10 and 11 in which the signal obtained is subtracted from the signals produced by circuits 3, 4 and 5, respectively. By means of gamma correction circuits 12, 13 and 14 the signals obtained are subjected to the required gamma correction. The output signals of circuits 12, 13 and 14, respectively are the drive signals R, G and B, respectively, which are applied to the suitable electrode of projection tubes XR, XG and XB, respectively.

The signal of stage 7 is also applied to a delay device T1, which produces a time delay of, for example, 9,984 ms, and the delayed signal is signal W, which is applied to the control electrode of projection tube XW. The signal for the horizontal deflection in tube XW need not be delayed, so that the same signal H may be applied to the line deflection coils of the four tubes. Portion 2 also generates the signal V1 for the vertical deflection for tubes XR, XG and XB. By means of a delay device T2 signal V1 is delayed by 9.984 ms and the delayed signal V2 is applied to the field deflection coil of tube XW.

With the simplifications assumed in the foregoing the flickering effect is effectively cancelled for peak-white. For this the following values apply:

$$r = g = b = 1,$$

so that $y = 1$ and $m = 1$ and $$W = 0,5y = 0.5$$

from which it follows that $R = G = B = 0.5$ while the total luminance is equal to $0.5 + W = 1$ and has remained the same. For a satured colour, for example red, it holds however that $r = 1$ and $g = b = m = 0$ and consequently that $W = 0$. For such a colour, which hardly occurs at high luminance, no zonal flicker reduction occurs. For white portions and also for unsaturated colours a considerable improvement is obtained with the device shown in FIG. 4.

In a third mode of driving the four-tube projector the luminance is optimized. In principle, a four-tube projector which is provided with three colour tubes and a monochrome tube can display peak-white twice as brightly as a three-tube projector. For fully satured colours said additional luminance is however impossible, but it is possible to use a drive mode which is based on the idea that for normal scenes it is acceptable to display fully satured colours with luminances which are not the maximum luminances with which white and unsatured colours are displayed. So at 100% saturation there is zero gain in luminance, while the gain for colours of low saturation is large. The transformation of signals r, g and b into signals R, G, B and W will now be defined as follows:

$$R = Fr - W$$
$$G = Fg - W$$
$$B = Fb - W.$$

Herein F is a factor still further to be determined.

From R, G, B $\geq 0$ it follows that: $W \leq Fm$ and from R, G, B $\leq 1$ it follows that: $FM - W \leq 1$.

Herein M represents the largest signal from the signals r, g and b. From these formulae it appears that the maximum value of factor F is given by:

$$F = \frac{W + 1}{M} = \frac{Fm + 1}{M}$$

from which it follows that:

$$F \leq \frac{1}{M - m}.$$

On the basis of the foregoing assumption that $W = 1$ while $R = G = B = 0$ results in the same luminance as $R = G = B = 1$ and $W = 0$ it holds that the maximum value F is equal to 2. From this it follows that factor F is equal to the value 2 or to $(1/M - m)$ if this number is less than 2.

For highly satured colours it holds that: $F = (1/M - m)$ and the choice for W is fixed already, namely $W = Fm$. At 100% saturation at least one colour component is zero and consequently m is equal to 0, so that $W = 0$, while $M = 1$ so that $F = 1$. This situation is the same as the case described in the foregoing in which no gain in luminance is obtained an no zonal flicker reduction occurs. At a lower saturation m is slightly greater than 0, so that W is not equal to zero, while M is smaller and F is larger than 1. So an improvement has been obtained both as regards the luminance and as regards flicker.

For colours having a still lower saturation it holds that: $F = 2$, which means that the luminance is twice as high as the case with a three-tube projector. In the range in which F is equal to 2 there is a certain degree of freedom as regards the choice of signal W, however within the limits determined by the formulae $$F = (W + 1/M)$$

and $$W = Fm$$

wherein $F = 2$, which means that W must be located between $2M - 1$ and $2m$. Taking account of these limit values, a partial optimization can now be performed, namely either the best possible sharpness, or the least possible extent of zonal flicker. In the first case $W = 2M$ or $W = 2M - 1$ will be opted for and in the second case $W = y$. If for said second case delay devices are employed then it appears that with this mode of drive flicker is reduced for the unsaturated colours to the same extent as in the case of FIG. 4, and that the luminance for these colours is twice as high. For the arrangement of FIG. 4 it was found that $W = \frac{1}{2}y$, which corresponds to a factor $F = 1$. Herein it should be noted that the factor $F = 2$ in the foregoing is based on the assumption that tube XW provides the same brightness for peak-white as tubes XR, XG and XB together. It will be obvious that in practice factor F may have a different value.

Figure 5:
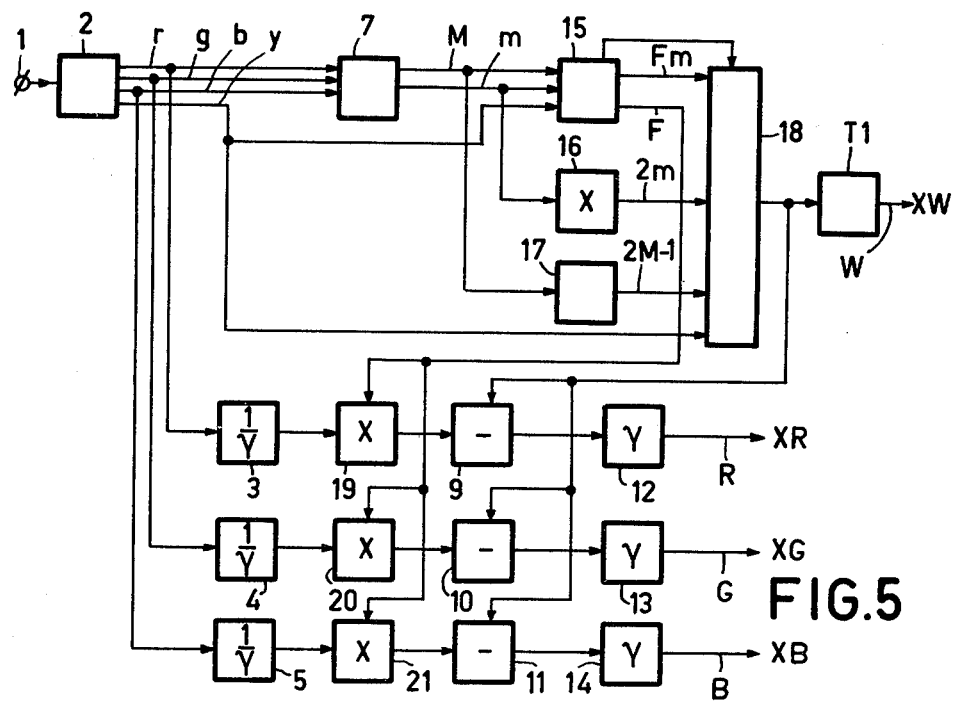

The preceding can be utilized for the arrangement shown in FIG. 5. As was the case in FIG. 4, the output signals r, g and b produced by signal processing portion 2 are each applied to a respective inverse gamma correction circuit 3, 4 and 5. Signals r, g and b are also applied to a comparator stage 7 wherein the highest M and the lowest m of said signals is determined. Signals M, m and y are applied to an arithmetical unit 15 which produces the signals F and Fm, wherein $F=2$ or $(1/M-m)$ if this is less than 2. Signal M is multiplied by 2 by means of a multiplying stage 16 while signal $2M-1$ is produced by a stage 17.

The signals Fm, 2m, $2M-1$ and y obtained are applied to a switching unit 18 which in response to a signal supplied by unit 15 chooses between the input signals. If $(1/M-m)$ is less than 2 then signal $Fm=(1/M-m)$ is passed. If $(1/M-m)$ is larger than 2 while y is larger than 2m, then signal 2m is passed. Signal $2M-1$ is passed if $(1/M-m)$ is larger than 2, while y is less than $2M-1$ and finally, y is passed in all other cases. Signal F supplied by unit 15 is multiplied by means of multiplying stages 19, 20 and 21 by the output signals of the respective circuits 3, 4 and 5. The output signals produced by stages 19, 20 and 21 as well as the output signal produced by unit 18 are applied to subtracting stages 9, 10 and 11 in which the signal produced by unit 18 is subtracted from the signals produced by the respective stage 19, 20 and 21. The drive signals R, G and B for tubes XR, XG and XB are obtained by means of gamma correction circuits 12, 13 and 14. The drive signal W for tube XW is delayed by means of delay device T1 by, for example, 9.984 ms with respecto to the output signal produced by unit 18.

Although the above-described embodiments relate to projection devices for projection on a screen, the invention is not limited thereto. For devices for three-dimensional television, for example, the invention can be used with advantage for the case that a two-dimensional picture is displayed, in which case the whole picture is observed by both eyes.

What is claimed is

1. In a color television display device comprising a plurality of picture display tubes for displaying a color television signal, each tube having a control electrode for receiving a video signal, a line deflection coil for deflecting in the horizontal direction an electron beam generated in the tube and a field deflection coil for deflecting the electron beam in the vertical direction, the improvement wherein a delay device is provided for delaying by substantially the same delay the vertical deflection of a first group of the display tubes with respect to the vertical deflection of a second group of the display tubes and the video signals applied to the control electrodes of the display tubes of the first group with respect to the video signals applied to the control electrodes of the display tubes of the second group.

2. A device as claimed in claim 1, wherein the delay is equal to an integral number of line periods of the horizontal deflection.

3. A device as claimed in claim 2, wherein the delay is approximately equal to a sub-multiple of the field period of the vertical deflection.

4. A device as claimed in claim 1, wherein the luminance of the picture displayed by the first group is substantially equal, at least for given colours, to the luminance of the picture displayed by the second group for the same colours.

5. A device as claimed in claim 1, wherein the delay device is included in the signal path of a composite video signal which is applied to a signal processing portion for generating the video signal and of the signal for the vertical deflection for the first group of the display tubes.

6. A device as claimed in claim 1 wherein said plurality of picture tubes comprises a first triplet of three colour display tubes each for displaying a different one of the three primary colours and a second similar triplet of three colour display tubes and wherein the first triplet forms the first group and the second triplet the second group of the display tubes.

7. A device as claimed in claim 1 wherein said plurality of picture display tubes comprises three colour display tubes each for displaying a different one of the three primary colours and a monochrome display tube for displaying black and white pictures and wherein the three colour display tubes form the second group, while the monochrome display tube forms the first group of the display tubes.

8. A device as claimed in claim 7, wherein a comparison stage is provided for determining the smallest signal of the input signals thereof, these input signals being the components of the colour to be displayed, as well as being the luminance signal derived therefrom divided by a given factor, the output signal of the comparator stage after being subjected to said delay being the drive signal of the monochrome display tube and the said factor being determined by the luminance properties of the display tubes.

9. A device as claimed in claim 7, wherein three subtracting stages are provided, each one for subtracting a second input signal from a first input signal, said first input signal being the output signal of an inverse-gamma correction circuit multiplied by a factor which is determined by the luminance properties of the display tubes, while the second input signal is the signal which after a delay is applied to the control electrode of the monochrome display tube, the input signal of the inverse gamma correction circuit being a component of the colour to be displayed and the output signal of the subtracting stage being applied to a gamma correction circuit for producing the drive signal for the control electrode of a colour display tube.

* * * * *